United States Patent [19]

Yamashita et al.

[11] 4,412,454

[45] Nov. 1, 1983

[54] PRESSURE SENSING UNIT FOR A PRESSURE SENSOR

[75] Inventors: Ichiro Yamashita, Yawata; Yukihiko Ise, Toyonaka, both of Japan

[73] Assignee: Matsushita Electric Industrial Co., Ltd., Osaka, Japan

[21] Appl. No.: 284,568

[22] Filed: Jul. 17, 1981

[30] Foreign Application Priority Data

Jul. 17, 1980 [JP] Japan .................................. 55-98378

[51] Int. Cl.³ ................................................ G01L 9/16
[52] U.S. Cl. ........................................ 73/728; 336/20; 336/30
[58] Field of Search .......... 73/728, 722, 753, DIG. 2, 73/779, 862.69; 336/20, 30; 324/209

[56] References Cited

U.S. PATENT DOCUMENTS

| 2,376,156 | 5/1945 | Kuehni | 73/722 |
|---|---|---|---|
| 2,460,076 | 1/1949 | Emerson | 73/722 |
| 3,940,992 | 3/1976 | Jost et al. | 73/728 |
| 4,322,973 | 4/1982 | Iwasaki | 73/517 R |

*Primary Examiner*—Donald O. Woodiel
*Attorney, Agent, or Firm*—Wenderoth, Lind & Ponack

[57] ABSTRACT

A pressure sensing unit for a pressure sensor using the magnetostriction effect of a ferrous amorphous magnetic alloy having elasticity which permits magnetostriction, and including an inductance element which has a magnetic core formed at least in part of the amorphous magnetic alloy and which is subjected to pressure so as to exert pressure on the alloy corresponding to the pressure to be measured, the resulting change in the value of the inductance being used to detect the applied pressure.

10 Claims, 20 Drawing Figures

PRESSURE SENSING UNIT FOR A PRESSURE SENSOR

BACKGROUND OF THE INVENTION

This invention relates to a pressure sensor, and more particularly to a pressure sensing unit for such a sensor using a magnetostriction effect to change inductance in response to pressure.

Conventionally, a fluid or gas pressure is measured by use of a diaphragm provided with a strain gauge having a piezo-resistance effect. A pressure sensor of such construction is designed with a bridge connection for the purpose of improving the sensitivity because the sensor, when used as a strain gauge unit, undergoes small changes in resistance with respect to the amount of strain. However, a sufficient output is not obtainable from the sensor and its handling is very troublesome. On the other hand, a semiconductor sensor using a silicon plate as the diaphragm which is provided with a strain gauge has recently been proposed as a sensor having a relatively large output. Such a silicon semiconductor sensor, however, is deficient in that its output depends very largely on the temperature and requires a temperature compensating circuit and moreover the silicon plate diaphragm is relatively fragile when subjected to an excessive pressure.

OBJECTS OF THE INVENTION

An object of the invention is to provide a pressure sensing unit for a pressure sensor which is capable of accurately measuring a fluid or gas pressure over a wide range.

Another object of the invention is to provide a sensitive pressure sensor unit for use in measurement of fluid or gas pressure.

A further object of the invention is to provide a pressure sensor unit which is not subject to breakdown even when subjected to an excessive force from a fluid or gas pressure.

These and other objects of the invention will become more apparent from the detailed description and examples which follow.

BRIEF DESCRIPTION OF THE DRAWINGS

FIG. 2-(B) is a plan view of the pressure sensor unit shown in FIG. 2-(A);

FIG. 11-(B) is a plan view of the soft magnetic body shown in FIG. 11-(A);

DETAILED DESCRIPTION OF THE INVENTION

Recently, an amorphous magnetic alloy has been available in a large quantity and at a low manufacturing cost and produced by use of super-quenching. The amorphous alloy is characterized in that it;

(1) is a superior soft magnetic material which can have a specific permeability ($\mu r$) of 10000 or more, (2) can undergo a large saturation magnetization, (3) can be given a large corrosion resistance simply by adding a small amount of Cr or the like, (4) can be given a strength equivalent to that of a piano wire as shown in the following Table 1 so that it can be made into a thin film which is sufficiently strong even when it is about 20 $\mu m$ in thickness.

TABLE 1

| Composition | Tensile Strength (kg/mm$^2$) |
|---|---|
| $Fe_{75}Si_{10}B_{12}$ | 340 |
| $Fe_{80}P_{13}C_7$ | 310 |
| $Fe_{72}Cr_8P_{13}C_7$ | 385 |

(5) the magnetic characteristic is only slightly dependant on the temperature in the vicinity of room temperature (a change of about 10% in a temperature range of $-10°$ to 50° C.), and (6) can provide a large magnetostriction effect from a ferrous amorphous magnetic body or the like. Hence, a magnetic circuit constituted of the amorphous magnetic alloy can constitute a device having a superior magnetic circuit to make use of the magnetostriction effect.

This invention has been designed to utilize in a pressure sensor unit for a pressure sensor the magnetostriction effect of the amorphous magnetic alloy having the aforesaid superior characteristics.

Figure 1:
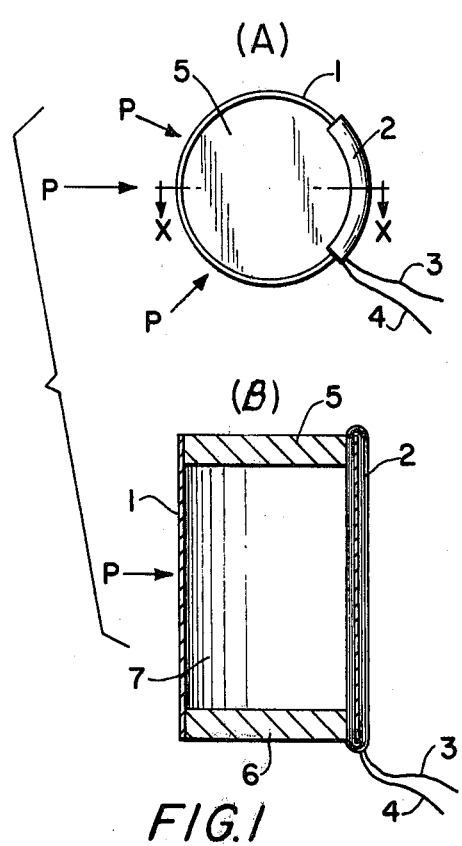
FIG. 1-(A) is a plan view of an embodiment of a pressure sensor unit according the invention, showing its construction, FIG. 1-(B) is a structural sectional view taken on the line X—X in FIG. 1-(A)

In FIGS. 1-(A) and -(B), reference numeral 1 designates a cylindrical bobbin made of a thin plate formed of an amorphous magnetic alloy having a good magnetostriction property, 2 designates an exciting coil coiled around a wall formed by the cylindrical plate 1 parallel to the axis of the cylinder with the ends 3 and 4 of the coil connected to a power supply and circuit characteristic detecting means for indicating pressure (not shown) to thereby apply voltage to coil 2, and 5 and 6 designate sealing lids covering the upper and lower ends of bobbin 1 to isolate the interior 7 thereof from the open air, the interior 7 being kept at a vacuum or at a constant barometric pressure. The bobbin 1 constructed as described above, when subjected at the outer periphery to a pressure P, is deformed inwardly to generate an internal stress. Hence, the magnetostriction effect changes the magnetism and reduces the specific permeability, resulting in a change of inductance at terminals 3 and 4, the variation being detected and used for measurement of the external pressure on the outer periphery of bobbin 1.

Figure 2:
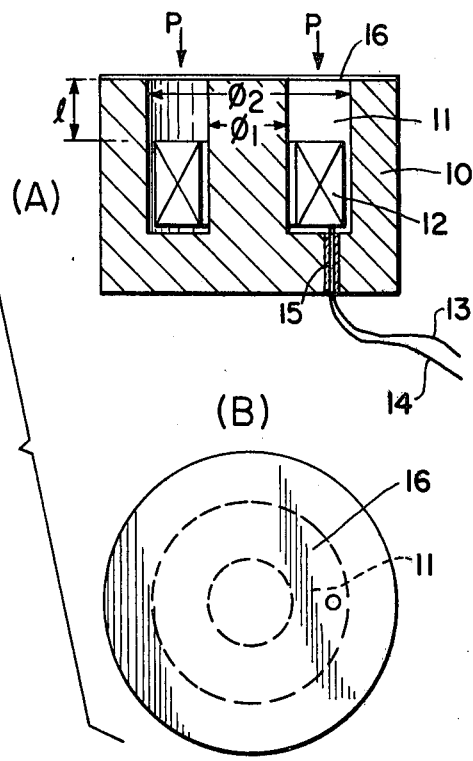
FIG. 2-(A) is a sectional view of a modified embodiment of a pressure sensor unit of the invention.

Referring to FIGS. 2-(A) and -(B), reference numeral 10 designates a cylindrical soft magnetic body of magnetic oxide material or ferrite, which is provided at one axial end face with an annular groove 11. An exciting coil 12 is disposed within annular groove 11 and terminals 13 and 14 of the coil extend out of groove 11 through an air-tight orifice 15 which is sealed with rubber or the like so that atmospheric air cannot flow into cylindrical body 10 through orifice 15. Reference numeral 16 designates a thin plate of amorphous magnetic alloy having the magnetostriction property, the plate 16 being mounted on the one axial end face to close annular groove 11 and form, together with the soft magnetic body, a magnetic circuit. The annular groove 11 is kept at a vacuum or at a constant barometric pressure. In addition, it is preferable that the property and dimensions of the cylindrical soft-magnetic body be such that a magnetic reluctance of the soft-magnetic body becomes smaller that that of the amorphous magnetic alloy.

If the pressure sensor unit is subjected to pressure P as shown in FIG. 2-(A), amorphous magnetic alloy thin plate 16 is deformed downwardly to generate an internal stress. As a result, the magnetostriction effect resulting from the internal stress causes the magnetism of plate 16 to change, thereby reducing the specific permeability $\mu r$. Hence, the inductance of the sensor when viewed from terminals 13 and 14, decreases which makes possible detection of the pressure causing the decrease by a detection means (not shown).

In the pressure sensor unit of the invention, in order to sense accurately the change in the circuit characteristic caused by the magnetostriction effect, the influence of leakage flux from exciting coil 12 should be reduced. In the sensor unit constructed as shown in FIG. 2, if the distance l between the end face of exciting coil 12 and the amorphous magnetic alloy thin plate 16 is too small, the leakage flux with respect thereto becomes larger, so that the change in the circuit characteristic caused by deformation of the plate 16 is different from what it would be if the distance l were larger, thereby making it impossible to measure the pressure with accuracy. Hence, in order to overcome this drawback, it is desirable to make the distance l larger than $(\phi_2-\phi_1)/2$, where $\phi_2$ is the outer diameter and $\phi_1$ is the inner diameter of the annular groove in the soft magnetic body 10.

Figure 4:
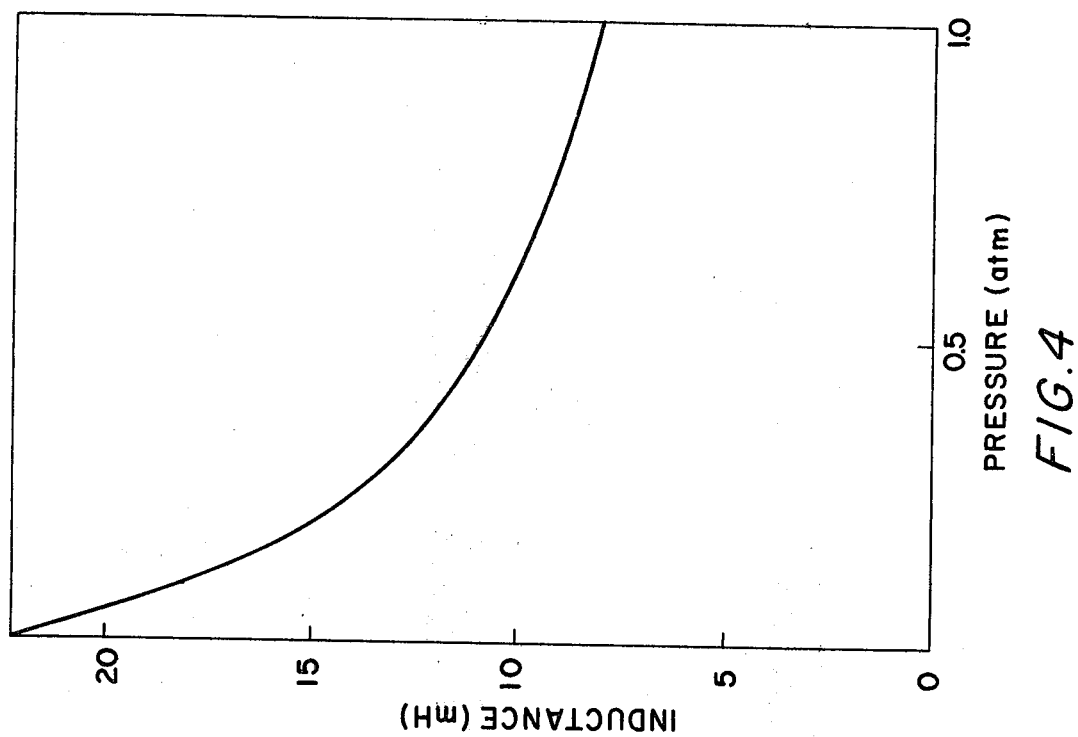
FIGS. 3 through 5 are graphs showing the relation between the pressure change and the inductance change where the pressure sensor shown in FIG. 2 is employed.
Figure 3:
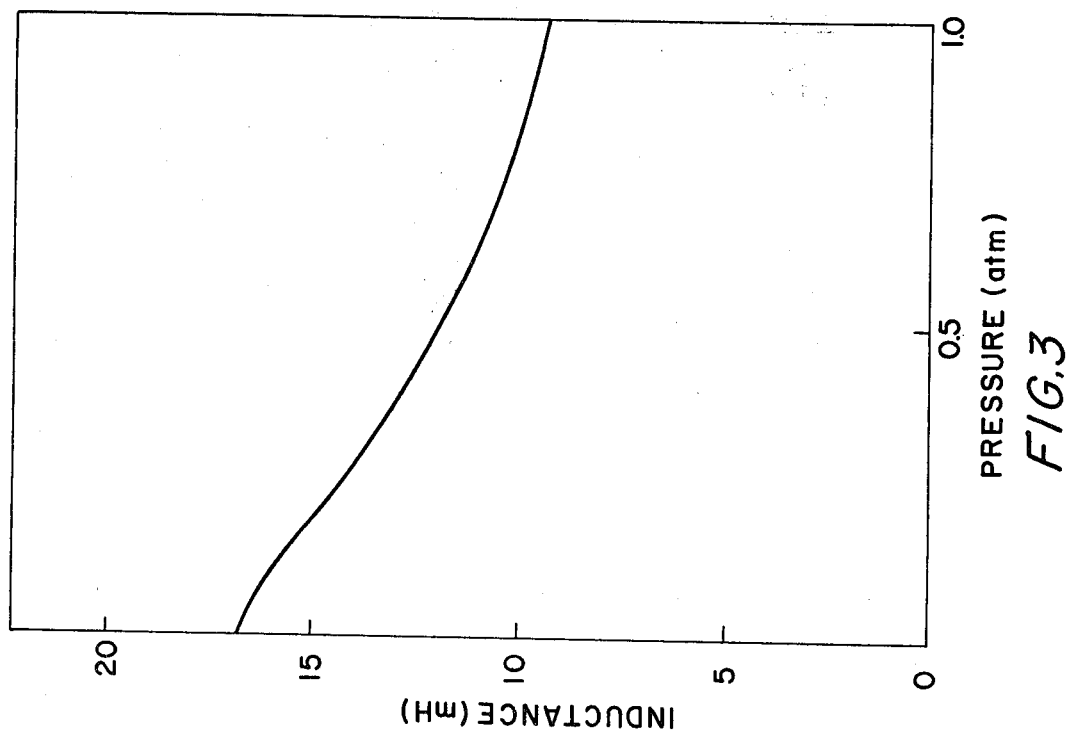
Figure 5:
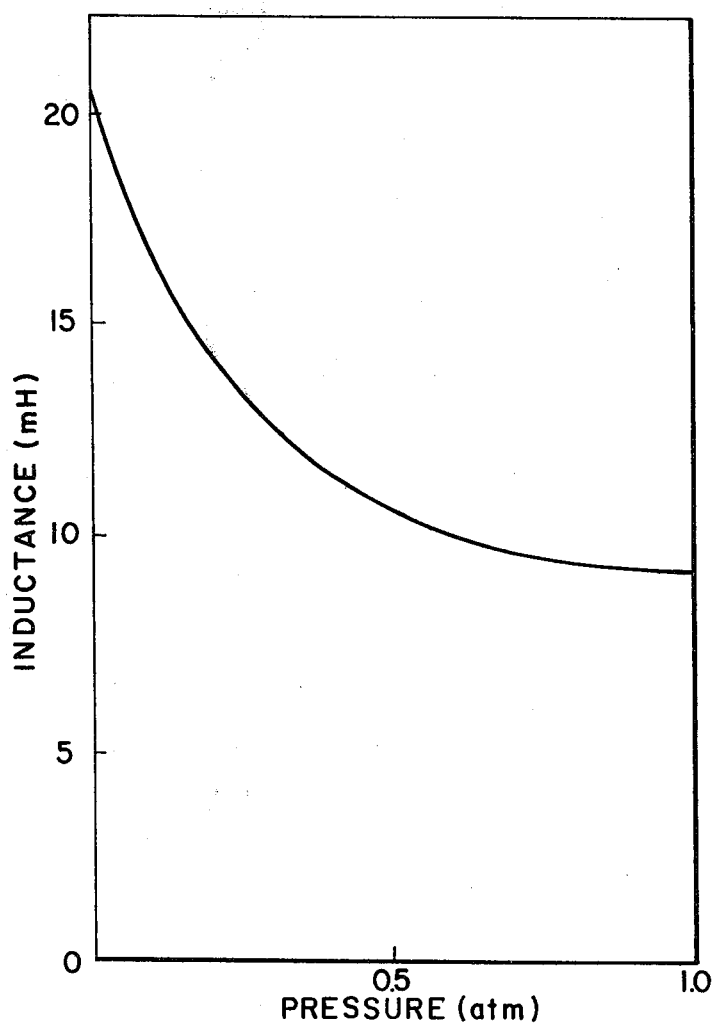

FIGS. 3, 4 and 5 show the relations between the pressure P applied to the amorphous magnetic alloy thin plate and the inductance when using the pressure sensor constructed as shown in FIG. 2, and data from experiments Nos. 1, 2 and 3 is shown in Table 2. The experimental condition which was varied in the three experiments was a width of the annular groove 11, in other words, one half the difference between the outer diameter $\phi_2$ of annular groove 11 and the diameter $\phi_1$ of the core of the soft magnetic body.

TABLE 2

| | | Experiment No. 1 | Experiment No. 2 | Experiment No. 3 |
|---|---|---|---|---|
| Amorphous Magnetic alloy Thin plate | Composition | $Fe_{78}Si_{10}B_{12}$ | $Fe_{78}Si_{10}B_{12}$ | $Fe_{78}Si_{10}B_{12}$ |
| | Thickness ($\mu m$) | 40 | 40 | 40 |
| | Saturation Magnetostriction Constant ($\lambda s$) | $33 \times 10^{-6}$ | $33 \times 10^{-6}$ | $33 \times 10^{-6}$ |
| | Saturation Magnetizing ($4\pi Ms \cdot KGauss$) | 15.3 | 15.3 | 15.3 |
| Soft Magnetic Body | Core Diameter $\phi_1$ (mm) | 11 | 12 | 13 |
| | Groove Outer Diameter $\phi_2$ (mm) | 7 | 7 | 7 |

TABLE 2-continued

| | Experiment No. 1 | Experiment No. 2 | Experiment No. 3 |
|---|---|---|---|
| Composition | Mn—Zn system | Mn—Zn system | Mn—Zn system |
| Exciting Coil | 200 turns (wire diameter 110 $\mu m$) | 200 turns (wire diameter 110 $\mu m$) | 200 turns (wire diameter 110 $\mu m$) |

As seen from FIGS. 4 and 5, when the groove width $(\phi_2-\phi_1)/2$ becomes larger pressure is detectable with a good sensitivity in a low pressure range of about 0.4 or less barometric pressure, but inductance changes less with respect to a pressure change and sensitivity falls in the high pressure range exceeding 0.4 barometric pressure.

While, it is seen from FIG. 3 that when the groove width $(\phi_2-\phi_1)/2$ becomes smaller, in a range of 0 to 1 barometric pressure, the variation of inductance decreases and sensitivity falls somewhat, but inductance changes more linearly, thereby making possible accuracy in measurement of the pressure in a wide range. Hence, the groove width $(\phi_2-\phi_1)/2$, when properly selected corresponding to the pressure measurement range in which the pressure sensor is to be used, enables accurate measurement of pressure.

In the prssure sensor unit of the invention, for example, when the barometric pressure changes from 0 to 1 as shown in FIG. 3, an inductance variation of about 50% can be sensed, which shows that the sensitivity is considerably improved in comparison with a resistance variation on the order of only several % in a conventional strain gauge.

Figure 6:
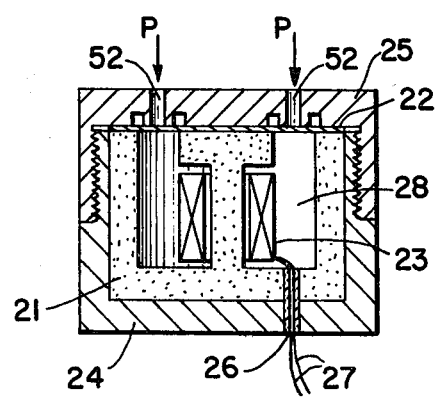
FIG. 6 is a structural sectional view of another modified embodiment of a pressure sensor unit of the invention.

Referring to FIG. 6, a magnetic circuit comprising a soft magnetic body 21 and an amorphous magnetic alloy thin plate 22, is excited by an exciting coil 23. A bottom support member 24 and a lid support member 25 are provided and a through bore 26, through which lead wires 27 of a coil 23 extend, is provided in soft magnetic body 21 and in bottom support member 24, and sealed with an airtight plug to keep the interior of the sensor airtight. In addition, the space 28 is kept at a vacuum or at a constant barometric pressure.

Figure 7:
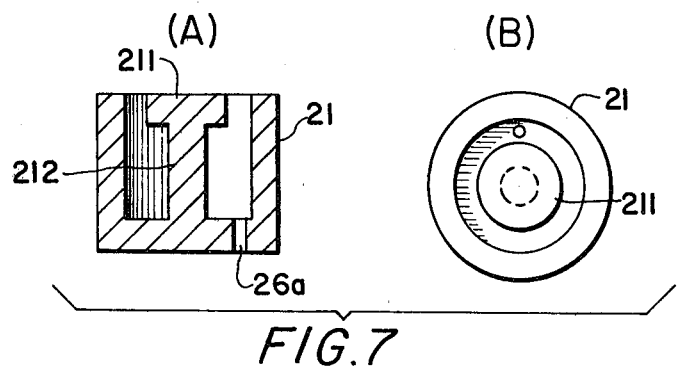
FIGS. 7 through 10 show components of the pressure sensor unit shown in FIG. 6, FIGS. 7A–10A being sectional views and FIGS. 7B–10B being plan views, respectively.
Figure 8:
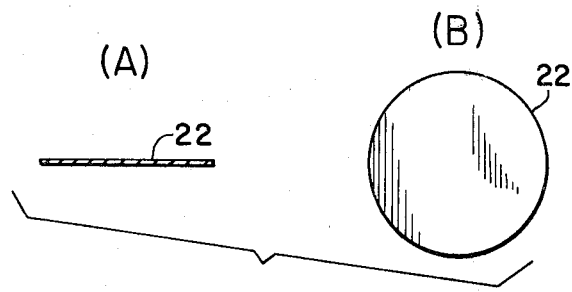
Figure 9:
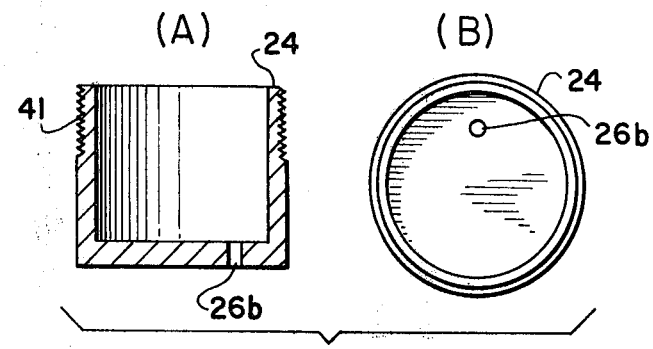
Figure 10:
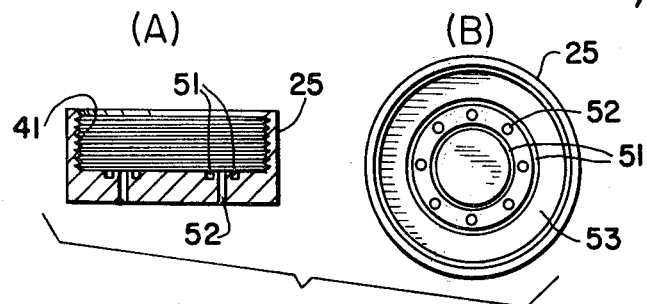

The aforesaid pressure sensor unit, as shown in FIGS. 7 to 10, has components of various shapes. FIG. 7-(A) shows soft magnetic body 21 in section and FIG. 7-(B) is a plan view of the body 21. The soft magnetic body 21 has a pot-like shape and has a central column 212 with a flange 211. FIG. 8-(A) shows an amorphous magnetic alloy thin plate 22 in section and FIG. 8-(B) shows the same in plan view, which plate is a disc having a diameter equal to the outer diameter of body 21 and which covers soft magnetic body 21 to constitute a magnetic circuit therewith and also to keep space 28 airtight. The bottom support member 24 shown in FIGS. 9-(A) and -(B) has the lid support member 25 threaded onto threads 41 to keep the thin plate 22 against the soft magnetic body 21 to form the magnetic circuit. A bore 26b is positioned to mate with bore 26a in soft magnetic body 21. The lid support member 25 is shown in section in FIG. 10-(A) and in plan view in FIG. 10-(B), which together with bottom support member 24 holds body 21 and plate 22 together in the aforesaid magnetic circuit. The support member 25 is provided with annular grooves 51 in the surface in press-contact with thin plate 24, the grooves 51 being positioned opposite the ends of the inner surface of the cylindrical wall and the outer surface of the flange 211. The width and thickness of each groove 51 are larger than the thickness of thin plate 22. Furthermore, an extremely thin and flexible non-magnetic film 53 is provided on the surface of support member 25 in press-contact with thin plate 22, thereby keeping space 28 airtight. Through bores 52 are provided between the annular grooves 51 for transmitting to amorphous magnetic alloy thin plate 22 an external pressure.

When the sensor unit, as shown in FIG. 6, is subjected to pressure P and the space 28 is placed at a vacuum, the pressure P is applied to amorphous magnetic alloy thin plate 22 through bores 52 in lid support member 25. As a result, thin plate 22 is deformed downwardly to generate an internal stress, by which its specific magnetic permeability $\mu r$ changes. Hence, the magnetic reluctance of the magnetic circuit comprising soft magnetic body 21 and amorphous magnetic alloy thin plate 22, changes, the change being taken out as a change of inductance in coil 23.

Figure 11:
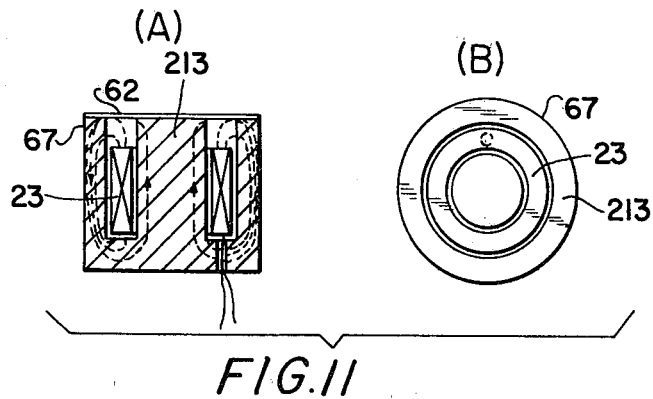
FIG. 11-(A) is a sectional view of a soft magnetic body of a different shape from that of the previous embodiments.

The characteristic of the pressure sensor shown in FIG. 6 is better than that illustrated in FIG. 11, in which the central column 213 has no flange. When the amorphous magnetic alloy thin plate 62 in the sensor in FIG. 11 is subjected to pressure it is deformed downwardly to shorten the magnetic path due to the absence of a flange on column 213. As a result, the magnetic reluctance decreases, which counteracts the increase thereof caused by the applied pressure, so that the effect due to the applied pressure is nullified. The flange 211 provided as shown in FIG. 7 will considerably reduce leakage flux produced by coil 23. In this case, when coil 23 has a coil diameter smaller than the diameter of flange 211, the magnetic flux is of course further decreased. Hence, the provision of flange 211 can considerably improve the output of the sensor in comparison with a sensor using a soft magnetic body 67 as shown in FIG. 11.

Figure 12:
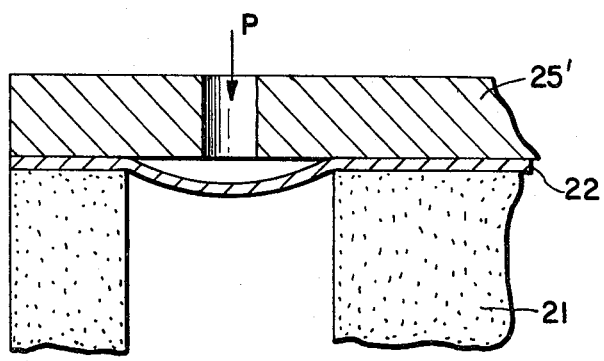
FIG. 12 is a partial sectional view on an enlarged scale, showing the effect of pressure on the sensor when the lid support has no groove as in FIG. 2.
Figure 13:
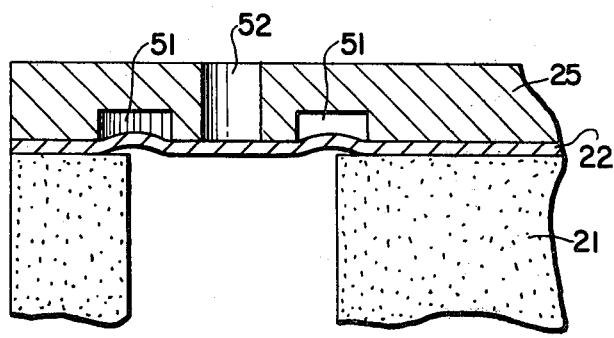
FIG. 13 is a partial sectional view similar to FIG. 12 but for the lid support having grooves as in FIG. 6.

Also, the characteristic of the pressure sensor in FIG. 6 is improved as compared with that of FIG. 2, as illustrated in FIGS. 12 and 13. It is preferred, for avoiding generation of even a minimum internal stress of the amorphous magnetic alloy by the applied pressure that the amorphous magnetic alloy thin plate 22 be in a condition in which it is given no internal stress at pressure P=0. Such method, however, is difficult to carry out in practice because the generation of internal stress is unavoidable when the amorphous magnetic alloy thin plate 22 is press-contacted with the magnetic body 21 even at a pressure of zero. Hence, it is rather practicable to previously apply to thin plate 22 when it is under a pressure P=0, a bias stress in the same direction as for generating the internal stress when the plate is subjected to pressure. To achieve this, a method has been proposed in which a lid support member is made flat at the surface thereof in contact with amorphous magnetic alloy thin plate 22 so that the plate 22 is deformed downwardly. Such method, however, is defective in that the internal stress from deformation by this pressure is small. Hence, the lid support member 25, as shown in FIG. 13, is provided with annular grooves 51 so that the edges of the opening in the soft magnetic body 21 are positioned opposite to and within the width of each groove 51, and the width and depth of each groove 51 is made larger than the thickness of the amorphous magnetic alloy thin plate 22, the width also being a fraction of the width of the opening in the body 21 at amorphous magnetic alloy thin plate 22. In this instance, the thin plate 22 is deformed as shown in FIG. 13 less than it is deformed in FIG. 12. Consequently, the amorphous magnetic alloy thin plate 22, when subjected to pressure, is deformed without reducing the internal stress to a minimum. Furthermore, the change of the internal stress is larger than that in FIG. 12.

As seen from the above, the pressure sensor of the invention uses the amorphous magnetic alloy which is magnetically superior and mechanically stiff so that its magnetostriction effect is used with high sensitivity, high durability and low dependency on the temperature.

Furthermore, the sensor of the invention permits the formation of a magnetic circuit to effectively utilize the magnetostriction effect, thereby obtaining a high output by pressing the amorphous magnetic alloy, and providing a consistent output.

Moreover, the pressure sensor of the invention has a very simple construction and is inexpensive to produce.

What is claimed is:

1. A pressure sensor unit comprising:
   a casing having at least in part thereof of a magnetic body and said casing forming an interior space isolated from the space around said sensor unit, said magnetic body having at least in a part thereof an amorphous magnetic alloy thin plate in a magnetic circuit with said magnetic body and which plate has a magnetostriction property and which is exposed to said inner space and the space around said sensor unit on opposite sides thereof; and
   a coil in magnetic relationship with said magnetic circuit for exciting said magnetic circuit.

2. A pressure sensor unit as claimed in claim 1 in which said interior space is at a pressure below atmospheric.

3. A pressure sensor unit as claimed in claim 2 in which said interior space is at a vacuum.

4. A pressure sensor unit as claimed in claim 1 in which said amorphous magnetic alloy thin plate is in the shape of a cylinder and said casing comprises two plugs airtightly closing the opposite ends of said cylinder, and said coil is wound on a portion of said cylinder through said opposite ends, and the space within said cylinder and between said plugs being said interior space.

5. A pressure sensor unit as claimed in claim 1 in which said casing comprises a first soft magnetic material body portion having a recess therein with an opening which opens out of one end face thereof, a second soft magnetic material body portion within said recess with one end thereof at said opening and the other end connected to said first body portion with a space between the periphery of said second body portion and the inner wall of said first body portion constituting said interior space, said exciting coil being disposed within said space around said second body portion, said amorphous magnetic alloy thin plate being positioned over said opening and connected with said first and second body portions and closing said recess.

6. A pressure sensor unit as claimed in claim 5 in which said first and second body portions are integral.

7. A pressure sensor unit as claimed in claim 5 in which the one end face of said first body portion and the face of said second body portion on said one end thereof are flush.

8. A pressure sensor unit as claimed in claim 5 in which the one end of said second body portion has a flange thereon extending laterally thereof partially across said opening.

9. A pressure sensor unit as claimed in claim 5 further comprising a non-magnetic material lid attached over said plate and having bores therethrough through which pressure is transmitted to said plate.

10. A pressure sensor unit as claimed in claim 9 in which said non-magnetic lid has in the surface thereof in contact with said plate at least one groove, said groove being opposed to and having the width thereof extending on opposite sides of the edge of one of said body portions where it extends to said opening.

* * * * *